United States Patent [19]
Loftus

[11] 3,939,570
[45] Feb. 24, 1976

[54] APPARATUS FOR AND PROCESS OF DETERMINING OVERSTRESS IN PIPE PILES

[76] Inventor: William F. Loftus, 78a Ridge Road, Valley Cottage, N.Y. 10989

[22] Filed: June 20, 1974

[21] Appl. No.: 481,475

[52] U.S. Cl............................ 33/178 E; 33/178 F
[51] Int. Cl.² .. G01B 5/20; G01B 5/12; E21B 47/08
[58] Field of Search............ 33/174 R, 174 L, 178 E, 33/178 F

[56] References Cited
UNITED STATES PATENTS

| | | | |
|---|---|---|---|
| 2,281,960 | 5/1942 | Vacquier | 33/178 E |
| 2,514,355 | 7/1950 | Barnes | 33/178 F |
| 2,553,350 | 5/1951 | Bayhi | 33/178 F |
| 3,495,340 | 2/1970 | Bunnell | 33/174 R |
| 3,718,978 | 3/1973 | Van Koevering et al. | 33/174 R |

Primary Examiner—Richard E. Aegerter
Assistant Examiner—Richard R. Stearns
Attorney, Agent, or Firm—Christen & Sabol

[57] ABSTRACT

Apparatus for determining the load-carrying capability of a hollow pile driven into the ground to carry a vertical load. The apparatus measures changes in the internal radius (diameter) of the pile at various points along its length. The apparatus includes rotatable sensing means which enters the pile and senses the internal configuration of the pile in at least one predetermined radial direction for at least one predetermined level along the length of the pipe pile. The rotable sensing means also produces a signal representative of the internal configuration for each such predetermined radial direction at each such predetermined level along the length of the pile. The apparatus also includes means for rotating the rotatable sensing means to the desired radial position, and means for moving the rotatable sensing means longitudinally in the pile to the desired point along the pile's length.

18 Claims, 20 Drawing Figures

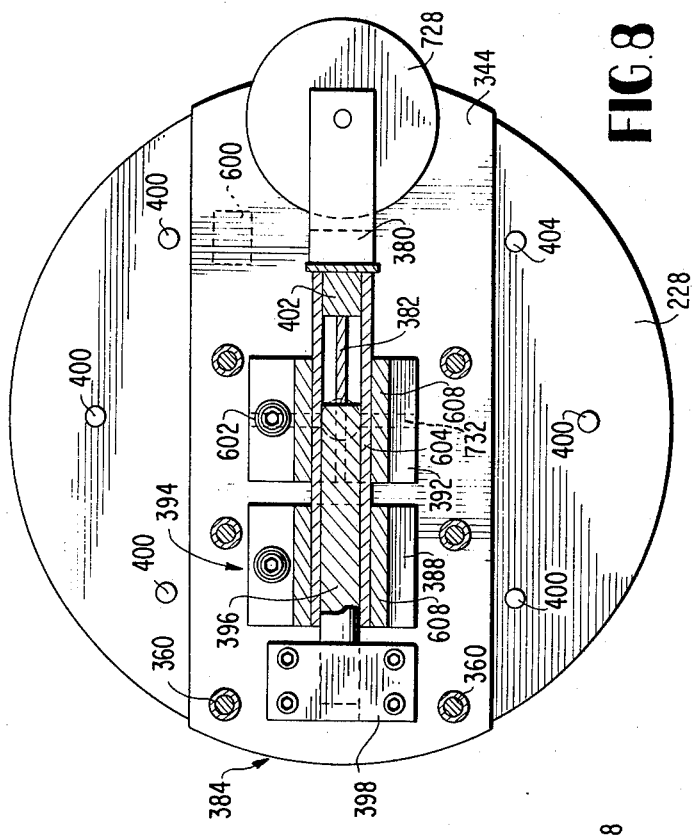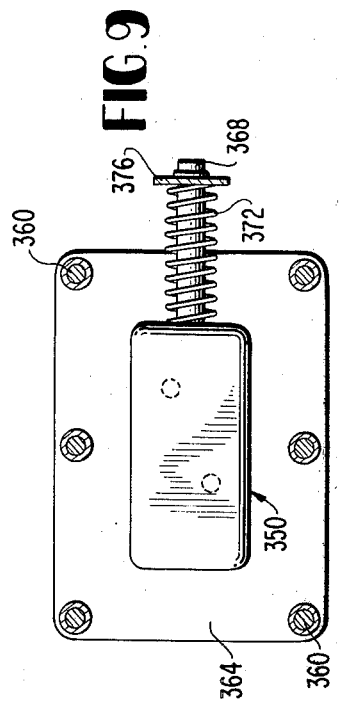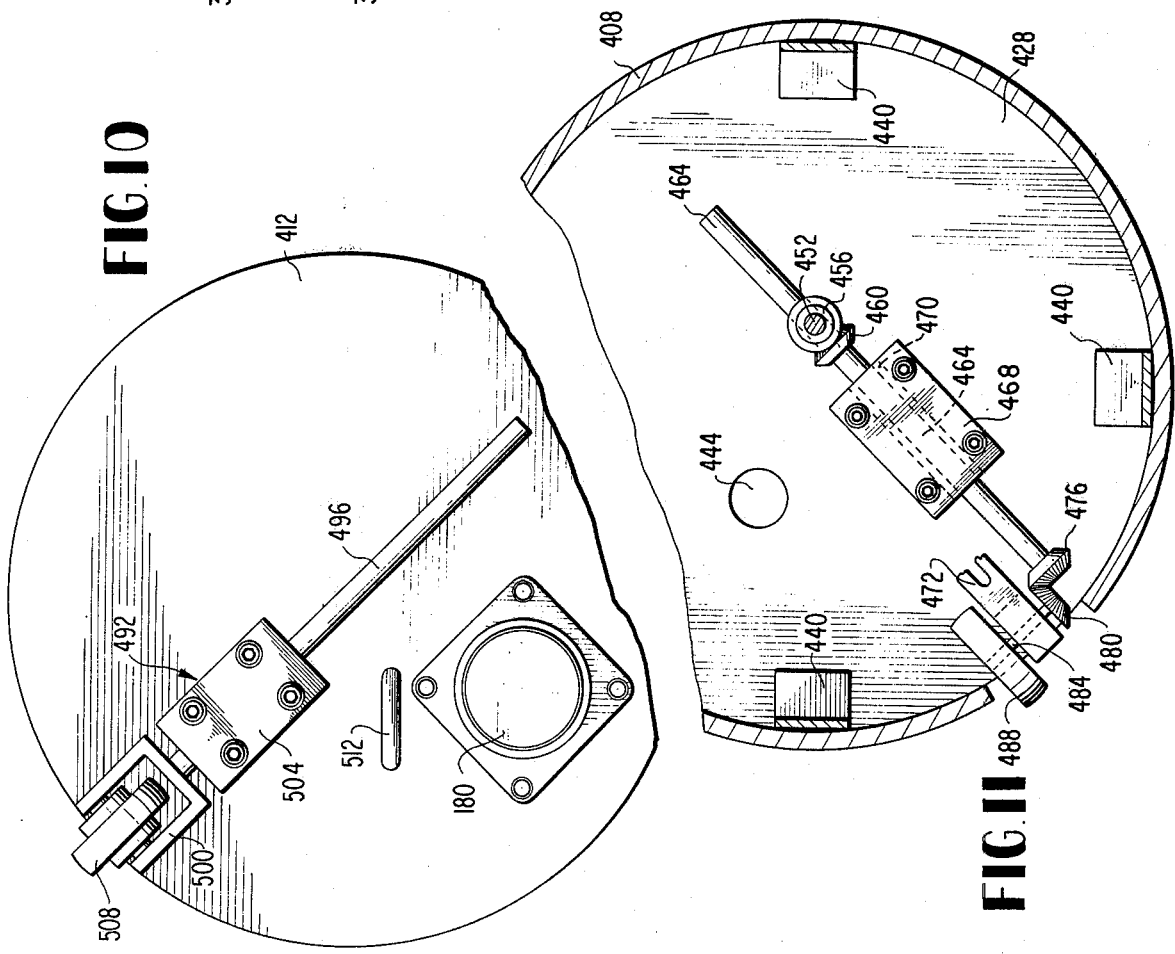

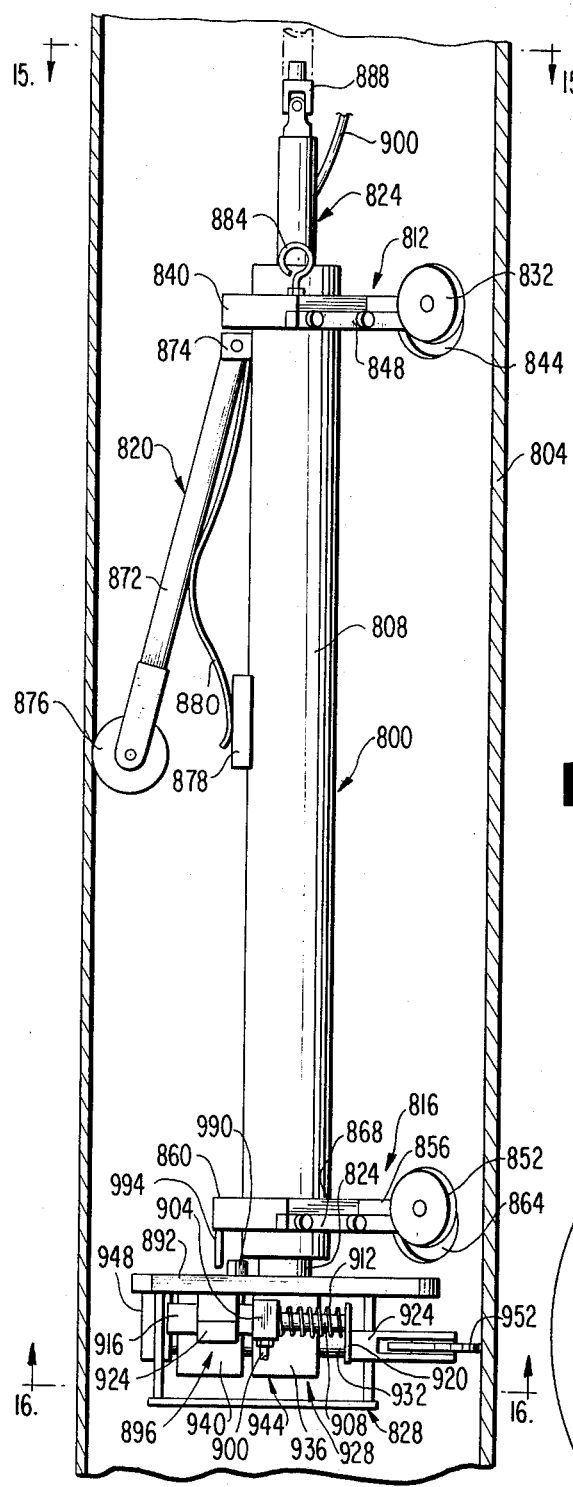
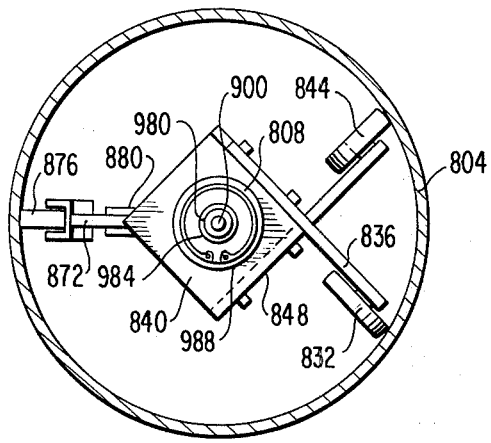
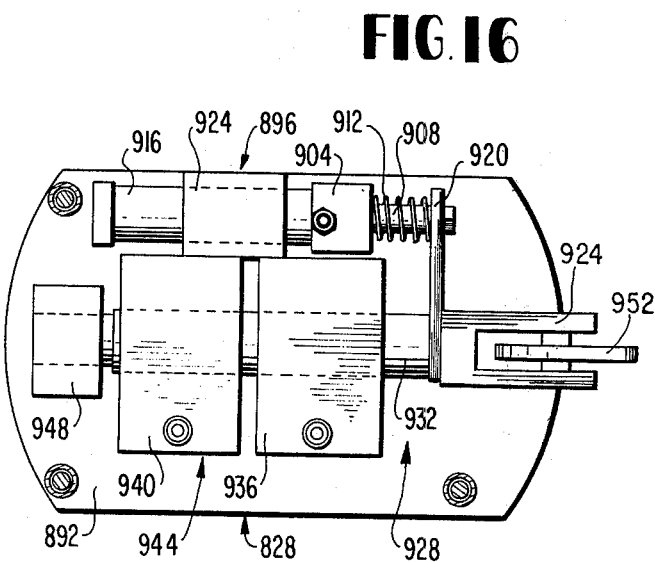

APPARATUS FOR AND PROCESS OF DETERMINING OVERSTRESS IN PIPE PILES

BACKGROUND OF THE INVENTION

1. Field of The Invention

This invention relates to means for measuring the overstress in pipe pilings and the like, for achieving such at any location in such pipe pilings. This invention further relates to means for remotely and automatically indicating and recording such measurements.

2. Prior Art

U.S. Pat. No. 1,890,607 discloses a depth indicator and inclinometer which includes a lower cable and a hermetically sealed shell. A plurality of wheels anchored on the shell and contacting the interior of a well casing or drill pipe. A travelling tape recording means located in the shell to measure the depth.

U.S. Pat. No. 2,030,244 teaches a calipering device for detecting and measuring variations in the inside diameter of a cylindrical tube. Arms which are adjusted to engage the side of the wall are mounted on the top end of the device. Spring-extended special arms are mounted on the lower end of the device. Indicating means are coordinated with the movement of the special arms so as to measure such movement and indicate such at above ground level. U.S. Pat. No. 2,074,753 teaches a gauge for indicating a irregularity in boiler or heater tubes, such irregularity indicating a weakened section in the tube. The gauge includes a head which a series of plunges slidably mounted through the side thereof in a radial manner. As the head travels inside the tube, a maximum degree of in and out movement of each of said plungers is electrically indicated at a remote station. This is done by means on a contact on the moving plunger meeting a positioned contact (one for inwards movement and one for outwards movement), which closes the appropriate electrical circuit and indicates a pipe deformity (in or out) of a certain magnitude or larger. The head is located on a rod and has pre-usage adjustable guides. Also, several guide disks are located on the rod.

U.S. Pat. No. 2,121,614 discloses a cylinder gauge for measuring and recording the minimum and maximum internal diameters of cylinders and tubes (such as, tubular oil stills). A series of radial floating wheels mounted on arms are radially located on each end of the cylinder and serve the purpose of aligning the cylinder. A series of radial floating recording arms, outwardly pressured, are located in the middle portion of the cylinder. A rotably horizontally mounted disc inside of the cylinder contains a disc of paper. The disc is mounted on a collar which contains ratchet teeth around its diameter. The mechanism allows remote manual manipulations that result in on-the-spot recordings of the maximum and minimum internal diameter of a tube at a particular location.

U.S. Pat. No. 2,497,990 teaches an apparatus for logging boreholes. The apparatus includes a body upon which are mounted two spring-outwardly pressurized arms — a rotary knife blade mounted on the end of each arm. The knife blade pierces the mud layer in the borehole. Curved sections are mounted on arms that are outwardly-faced from the body. The arms are electrically connected to a surface-located recording galvanometer which records the resistance of the particular circuit being measured at that time — this allows measurement of the thickness of the mud cake on the hole wall between the two appropriate arms.

U.S. Pat. No. 2,518,663 teaches a tube calipering and recording device for measuring and recording variations in the internal surface wear of pipes and the like. The device is completely self-contained and mechanically operated and does not require the use of insulated electrical cables communicating with the surface — this means that results cannot be obtained until the device is pulled back up to the surface and opened. The device contains a plurality of wall feelers that are sequentially positioned to by a recording means that is driven by a wheel which contacts the tube wall. Only the deepest pit in the tube wall can be measured by the devices at a particular depth.

U.S. Pat. No. 2,527,170 discloses an apparatus for detecting corrosion of a casing or tubing — such corrosion usually occurs on the outside of the casing. The corrosion causes a decrease in the thickness of the casing wall, which produces a readily distinguishable signal on a recording of a magnetic scan. The apparatus has a rotating scanning devise which includes a permanent magnet on one end of a rotating arm, a magnetic material on the other end and a coil wound around the latter, and has a surface located recorder (pen type or galvanometer type). The scanning device is driven by a battery-driven motor located in the apparatus. The apparatus contains a self-centering arrangement which involves at least three wheels on arms that are spring-loaded by a centrally located spring. A disadvantage of the apparatus appears to be that the scanning device must be rotated with little clearance to the casing wall, which of course means that many different apparatus having the appropriate diameter are required in order to measure casings having not too wide a difference in internal circumferences.

U.S. Pat. No. 2,578,236 teaches a tubing calipering device which includes spring-loaded wheel drive means. Particular means are taught for recording the deepest pit in tubing which is located by a rotating arm contacting the tubing wall. The device includes a self-contained stylus-chart arrangement.

U.S Pat. No. 2,656,613 teaches an apparatus for calipering well bores — it is used for measurement of bores which may have relatively wide variations in measurements. The apparatus utilizes a plurality of arms which follow the bore wall. The arms control a strain gauge which sends out a frequency which is in direct proporation to the average position of the plurality of movable arms. U.S. Pat. No. 2,680,913 discloses a device for determining the shape and diameter of well bores. The device contains a plurality of releaseable arms that are spring-forced outwardly against the bore wall. A clock mechanism to drive a tubular chart affords a stylus record of diameter for each arm as the device is removed from the bore.

U.S. Pat. No. 2,708,316 teaches a calipering and recording device for use in tubes. The device has a plurality of wheels that are pressured against the bore wall in order to adjust to different diametered bores and to prevent rotation of the device during measurement. The device contains a series of feelers which contact the bore wall. The feeler movement causes reciprocative movement between a stylus and a chart which records in effect the feeler value and movement. The device has wheel drive means.

U.S. Pat. No. 2,719,361 teaches an apparatus for calipering a well bore as it is being drilled. The end of the apparatus contains a series of retractable outwardly-forced arms. Below the apparatus is the drill bit. Along the same lines, see U.S. Pat. No. 2,719,363.

U.S. Pat. No. 2,815,578 discloses an apparatus, including telemetering system, for measuring and recording dimensions, temperature, pressure or other variable phsyical conditions in well boreholes. The apparatus contains four arms (contacts) which ride on the borehole wall. The measurements are made using a particular rotating helical contact, means for speed synchronization and surface recording. U.S. Pat. No. 2,973,583 discloses a tube calipering device which contains two sets of wheels in contact with the wall of the tubular conduit. The device has a series of spring-loaded arms which engage the wall in order to locate and measure irregularities in the wall such as those caused by corrosion or resulting from mechanical damage of tubes used in furnaces and the like. The device contains some very narrow and specific limiting features.

U.S. Pat. No. 3,685,158 teaches an apparatus for making measurements in a well bore. The apparatus contains at least one pair of specific, articulated wall-engaging members.

Attention is also drawn to U.S. Pat. No. 770,978.

The prior art does not teach or suggest a device, which can be lowered into a driven piling, that detects overstress in a pipe piling.

BROAD DESCRIPTION OF THE INVENTION

An object of this invention is to provide an apparatus and a method for measuring the overstress in pipe piles, and the like, at any location in such pipe piles. A further object is to provide an apparatus and a method for remotely and automatically indicating and recording such measurements.

Another object of this invention is to provide a device and a process for measuring and recording the longitudinal and radial position in the pipe piling where the diameter is being measured.

Another object of this invention is to provide an apparatus and process whereby a longitudinal profile of the internal wall of a pipe piling can be made.

Another object of this invention is to provide a device which is capable of measuring the diameter at any and all positions in a tube.

Another object of this invention is to provide a device which can be used across a fairly wide range of internal diameters (i.e., different diametered pipe pilings).

Another object of this invention is to provide an apparatus and a method for measuring with extreme accuracy the internal configuration of a pipe piling.

Another object of this invention is to provide a device which has arms which continuously are in pressure contact with the pipe piling wall.

Another object of this invention is to provide a device which has a self-contained drive means.

Another object of this invention is to provide a device which is capable of measuring the diameter of a tube.

Another object of this invention is to provide a device which is capable of ascertaining the longitudinal position in a tube.

Other objects and advantages will be apparent to one ordinarily skilled in the art from the following description, taken in connection with the accompanying drawings. This invention achieves such objects and has such advantages.

The apparatus of this invention broadly involves means for measuring the internal dimensions of a hollow pipe pile or the like and means for correlating such measurements to the stress or overstress in such hollow pipe pile or the like.

This invention involves caliber means to measure overstress in a pipe piling in conjunction with remote sensing means, and more narrowly involves additional means for lowering and raising the caliber means into and out of, respectively, of the pipe piling.

Apparatus of this invention is useful for developing data from which the load-carrying capability of a hollow pile driven into the ground to carry a vertical load can be determined. The apparatus measures changes in the internal radius (diameter) of the pile at various points along its length. The apparatus includes rotatable sensing means which enters the pile and senses the internal diameter of the pile in at least one predetermined radial direction for at least one predetermined level along the length of the pipe pile. The rotatable sensing means also produces a signal representative of the internal configuration for such predetermined radial direction at each such predetermined level along the length of the pile. The apparatus also includes means for rotating the rotatable sensing means to the desired radial position, and means for moving the rotatable sensing means longitudinally in the pile to the desired point along the pile's length.

An advantage of this invention is that the apparatus does not have to be returned to the surface and opened before any of the measured data can be obtained. The automatic and continuous recording features of this invention allow the instantaneous delivery of data (with correlation of its vertical and radial position in the pipe piling) in a recorded and visual form to the surface observer.

The apparatus of this invention travels inside of a pipe piling, checks for and measures any overstress, and indicates any such overstress and its longitudinal and axial location in such piling. The apparatus of this invention has the advantage of remote readings of any such overstress (quantitative) and their locations.

The apparatus measures an overstress at a particular location in the pipe piling by meansuring the change in the internal surface of the pipe piling.

As used herein, the term "overstress" is any stress which has resulted in the pipe piling being theoretically incapable of handling the intended load. (Overstress is stress beyond the critical stress — there is plastic deformation before the critical stress point is reached.) Such overstressed conditions include buckling or collapse of the pipe piling, but an advantage of the apparatus of this invention is that overstress can be detected, since prior laboratory analysis enables predictability of pre-buckling and pre-collapse occurrences — the apparatus of this instrument can be used to check these predictions based upon the prior laboratory analysis.

Another advantage of the apparatus of this invention is that its measurements can be used as a guide to ascertain if further pipe pilings are needed.

The apparatus of this invention will determine if there has been an increase or decrease of the internal diameter of the pipe piling. Overstress generally involves a increase in the internal diameter of the pipe piling, and such an increase generally occurs until there is a buckling or collapse of the pipe. It should be noted that the apparatus of this invention can determine not only if overstress has occurred, but can determine if any stress has occurred (which is represented by a change in the internal diameter of the pipe piling).

One embodiment of this invention involves caliber means having a hollow casing containing a lifting hook for the lowering and raising of the caliber means inside of the pilings. Wheels are provided at the extremities of the casing to provide wheels to enable continuous contact with the wall of the piling. Four of the wheels are fixed permanently; and the two remaining wheels are spring loaded such that continuous contact with the internal wall of the piling is maintained. A rotating sensing device is used which "sees" (detects) variations in internal configuration of the piling. The sensing device preferably incorporates a linear potentiometer. The measurement method can be done by a phasing circuit to null out the measuring or sensing at the base and the extent of measurement can be the same for the same loss or gain of diameter. In general this embodiment involves measuring the overstress in a driven piling by an instrument comprised of caliber means to measure an increase or decrease in internal configuration in such piling in conjunction with remote sensing means, and additional means for lowering and raising the caliber means into and out of, respectively, the piling which measures the loss or gain of inside diameter of the piling, such being a measurement of the overstress. This embodiment also involves the instrument.

The process of this invention broadly involves measuring the internal diameter of a hollow pipe pile or the like and correlating such measurements to the stress or overstress in such hollow pipe pile or the like.

The process of this invention is useful for determining the load-carrying capability of a hollow pile, tube, or the like, to carry a load in the direction of the longitudinal axis of the hollow pile, tube, or the like. The process is normally conducted re pipe pilings which have been driven into the earth. The process includes measuring the changes in the internal radius (diameter) of the hollow pile, tube or the like, at various points along the length thereof and/or around the circumference thereof at various positions along the longitudinal axis thereof, and converting such measurements of changes in the internal radius of the hollow pile, tube or the like, into any overstress values for the points or positions where such measurements were made. (There will be no overstress value for an internal diameter which has not changed or changed at least certain amounts.

The process of this invention involves the measurement of a pipe piling or the like having any initial cross-sectional configuration, although the preferred initial cross-sectional configuration is circular, and variation of such cross-sectional configurations along the longitudinal axis of the pipe piling. Examples of such cross-sectional configurations are circular (preferred), oblong, square, rectangular, hexagonal, elliptical, etc. Furthermore, the pipe piling need not have a straight longitudinal axis, but can have a curved longitudinal axis.

This invention is not restricted to the measurement of overstress in pipe pilings, but can be used to measure the overstress in any pipe in any environment. Pipes used to carry fluids, acting as conduits for electrical cables, etc., can be measured for overstress, the only proviso being that the pipes be cleared of all fluids, cables, etc., before the apparatus of this invention is used. Exceptions would be that the apparatus of this invention can be used in nitrogen and similar gaseous atmospheres; in fact, if properly encased, the apparatus of this invention can be used in liquid environments (it is noted that one embodiment of this invention provides the apparatus with drive means). The apparatus of this invention can be used under pressures which are greater than or less than atmospheric pressure. The pipes can be buried in the earth, immersed in fresh or sea water, laying on the ground, suspended in the air, etc., and can still be measured for overstress by the apparatus of this invention. Also, the pipes can be vertically located or at an angle, including horizontally located. The apparatus of this invention can be used to measure overstress in tubes in nuclear reactors, boilers and the like. The apparatus of this invention can be modified for use of measuring overstress (and detecting changes in wall profiles) in long distance oil and gas pipe lines (cleared of product) by use of radio guidance means and radio data transmission means.

The apparatus of this invention can be miniaturized to measure pipes having an inside diameter of less than 10 inches.

The correlation of the measurements obtained by the apparatus of this invention with the overstress that has occured can be done as follows: prior to driving, applicant's instrument is inserted into the pipe piling and at various pre-determined distances inside the pipe, diameter measurements are made with the instrument. These measurements are simply distances from the center of applicant's instrument to the face of the pipe. After the pile is driven, applicant then inserts his instruments to the same predetermined points and repeats the measurement taking. (A visual inspection by use of a flashlight is made up so as to give any visual indications of stress.) A comparison of the readings from the two sets of measurements indicate the change that occured in the internal surface of the pile during driving.

Comparison of the data taken in the two sets of measurements (differences between) with previously known data obtained from a university's laboratories indicates any actual (and a possible) overstress conditions. It is for this that laboratory-produced overstressed charts are obtained — comparison of this chart with the field obtained chart then enable applicant to determine if an overstress has occured. Or, in other words, a stress-strain curve is obtained by knowing the load, cross-sectional area and strain (outside gauges). On the stress strain curve the point at which the pile is considered to be overstressed is that point at which the scope of the curve goes to zero (point of critical stress). See FIG. 8. This point theoretically differs from the traditional yield point (A—A) because of the conditions under which piling is considered. A curve of $\Delta \Sigma$ ave. correlated to strain is obtained by calculation. By using these two curves, applicant is able to correlate stress to $\Delta \Sigma$ ave. This indicates where the critical stress point is and if it has been exceeded.

After a period of time, corrosion takes its toll on pipe piles, so a corrosion factor is necessary. There is a determinable and different factor for each period of time which can be applied before or after readings in order to correct the readings for the corrosion.

Typical of driven pipe piles which can be tested for overstress by this invention are: a 14 × 0.375 wall pipe pile; a 12¾ × 0.375 wall pipe pile; a 10¾ × 0.500 wall pipe pile; a 10¾ × 0.375 wall pipe pile; a 10¾ × 0.250 wall pipe pile; a 10¾ × 0.188 wall pipe pile; a 12¾ × 0.500 wall pipe pile; a 12¾ × 0.250 wall pipe pile; a 12¾ × 0.188 wall pipe pile; a 14 × 0.500 wall pipe pile; a 14 × 0.250 wall pipe pile; and a 14 × 0.188 wall pipe pile. The pipe piles are often 60 to 70 feet in length. By modifying the apparatus of this invention to have guide wheels and a measuring wheel which adjust to a tapered hollow pile, the apparatus of this invention can be used to determine any gain or loss of cross-section in said tapered pile.

Often overstressing is necessary due to the production-oriented contractors, the bearing stratum, hydrostatic buildup during installation, etc. This makes it necessary to determine if overstress has occurred and to what degree, so that a sufficient (but not wasteful) number of other pipe piles can be driven to afford the required support. This invention allows major cost savings by the use of smaller wall thicknesses in the pipe pilings and/or the use of fewer pipe pilings.

DETAILED DESCRIPTION OF THE INVENTION

The invention is described in more detail in the drawing in which:

FIG. 8 is a view in cross-section, taken along line 8—8 of FIG. 1;

FIG. 9 is a view in cross-section, taken along line 9—9 of FIG. 1;

FIG. 10 is a view in cross-section, taken along line 10—10 of FIG. 2;

FIG. 11 is a view in cross-section, taken along line 11—11 of FIG. 2;

FIG. 14 is an elevational view of one embodiment of the pile scanner apparatus of this invention;

FIG. 15 is a top elevational view, taken along lines 15—15 of FIG. 14;

FIG. 16 is a bottom elevational view, taken along lines 16—16 of FIG. 14;

Figure 3:
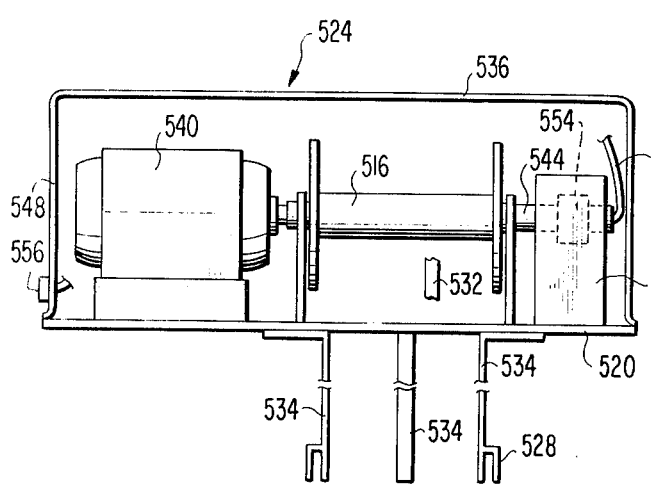
FIG. 3 is a sectional elevational view of the wench raising and lowering segment of the preferred embodiment of this invention.
Figure 2:
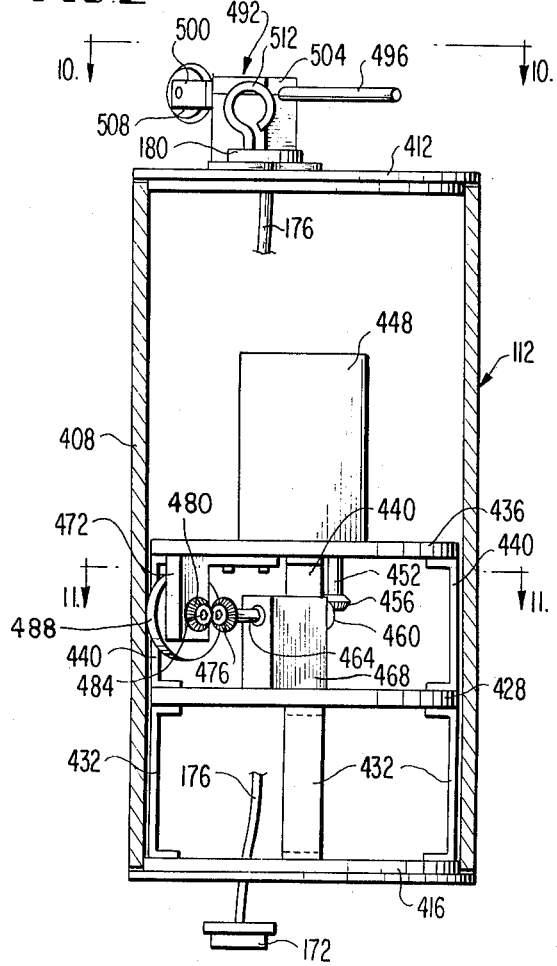
FIG. 2 is a sectional elevational view of the drive segment of the preferred apparatus of this invention.
Figure 1:
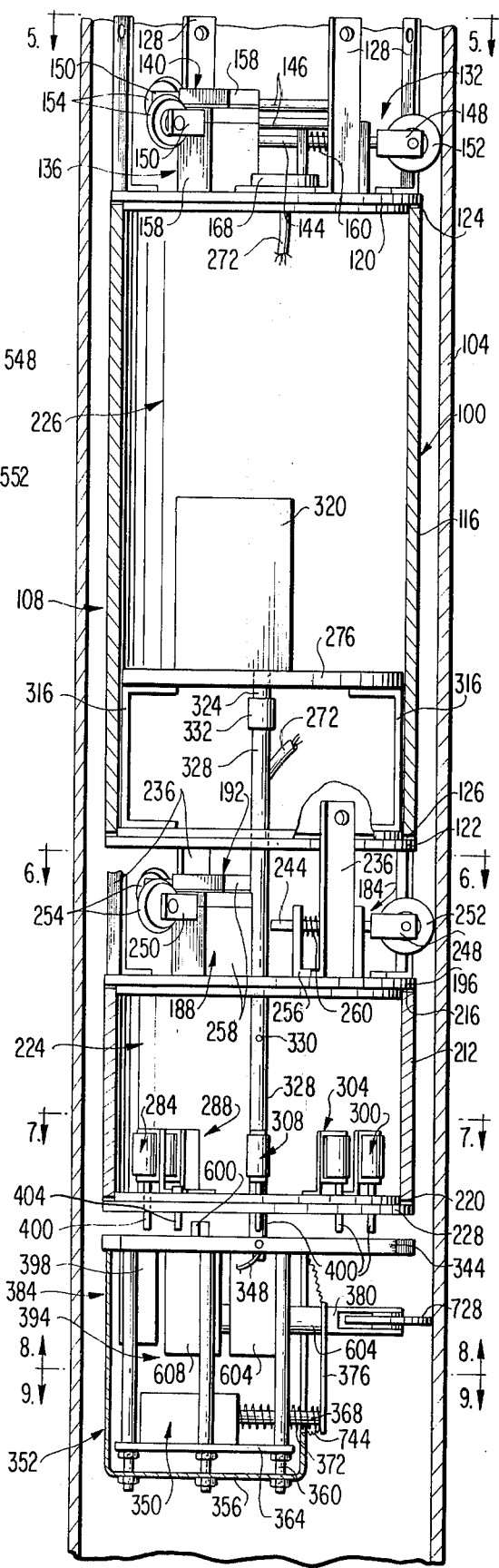
FIG. 1 is a sectional elevational view of the pile scanning segment of the preferred apparatus of this invention.
Figure 13:
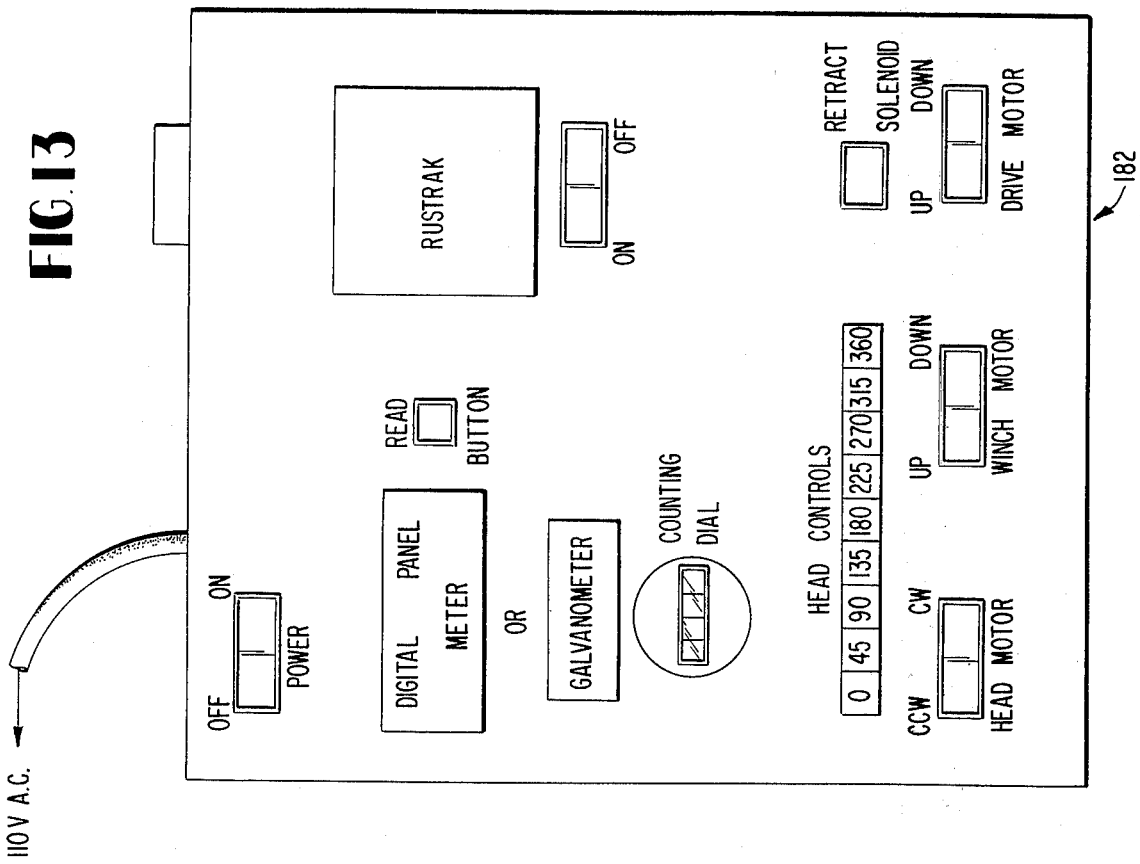
FIG. 13 is a front view of the above-surface measuring and recording means.

FIGS. 1 to 13 represent the preferred embodiment of the apparatus of this invention. Pile scanner 100 is located inside of (hollow) pipe piling 104 and includes pile scanner unit 108 and drive unit 112 (optional in vertical pipe piles). See FIGS. 1 and 2. Preferably pile scanner 104 is used without drive unit 112 and raised and lowered by means of eyelet 200 (see FIG. 5) on top of scanner unit 108 and a flexible steel lifting cable (not shown) to the surface. When the apparatus of this invention is used in horizontal pipes, drive unit 112 should be used. Segment 226 of pile scanner unit 108 includes tubular casing 116, upper cover plate 120 and lower cover plate 122. A portion of upper cover plate 120 fits into tubular casing 116 and a portion fits over the top rim of tubular casing 116 — seal 124 is located between upper cover plate 120 and the top rim of tubular casing 116. Seal 124 can be made of any suitable sealant material, but preferably is an "O" ring neoprene seal. A portion of lower cover plate 122 fits into tubular casing 116 and a portion fits over the bottom rim of tubular casing 116 — seal 126 is located between lower cover plate 122 and the bottom rim of tubular casing 116. Seal 120 can be made of any suitable sealant material, but preferably is an O ring neoprene seal. Segment 226 of pile scanner unit 108 is a completely sealed unit which is vapor and liquid impenetrable — this is preferred so as to make sure that vapors and liquids do not foul and cause problems with the internal components of pile scanner unit 108. Four L-shaped brackets 128 are mounted on upper plate 120. When used, unit 112 is attached to pile scanner unit by means of brackets 128. Three wheel units 132, 136 and 140 are mounted on upper plate 120. See FIG. 5. Wheel unit 132 includes rod 144, U-shaped bracket 148, wheel 152, spring box 156, spring 160 and ring (washer) 164 which mounted on rod 144. Spring 160 presses against ring 164, thereby urging wheel 152 against the internal wall of pipe piling 104. Rod 144 contains a series of holes 166. Pin 162 fits into one of the holes 166 (see FIG. 5), which in turn positions ring 164 on rod 144. This allows wheel 152 to be positioned in relation to the external wall of pipe piling 104 before pipe scanner 100 is placed into pipe piling 104, and also allows an adjustment of the spring tension of spring 160. Wheel units 136 and 140 each includes rod 146, U-shaped bracket 150, wheel 154 and fixed wheel holding block 158. Rods 146 are adjustable within fixed wheel holding blocks 158 in order to be able to adjust for various diametered pipe pilings. Each fixed wheel block 158 is comprised of two parts which form an internal passageway in which rod 146 fits. The three wheel units 132, 136, and 140, plus the three wheel units 184, 188 and 192 located below on top cover plate 196, keep pile scanner 100 centered in pipe piling 104. The two fixed wheel units of each set of three wheels are fixed at an angle of 90° to each other — the spring loaded wheel unit is at a 135° angle to the two fixed wheel units. The two fixed wheel units of each set of wheels are aligned within the same horizontal plane. The wheels of each set are rotably mounted parallel to the longitudinal axis of pipe scanner 100 or pipe piling 104. Electrical connector 168 is part of the electrical circuitry — electrical connector 168 is plugged into mating electrical connector 172 (see FIG. 2), which is connected by electrical cable 176 to electrical connector 180. In turn, electrical connector 180 is connected electrically to surface indicating-recording unit 182. . The simplified circuitry of FIG. 12 sets out surface unit 182, which is shown (circuitry) in greater detail in FIG. 4. The control panel for surface unit 182 is shown in FIG. 13.

Figure 4:
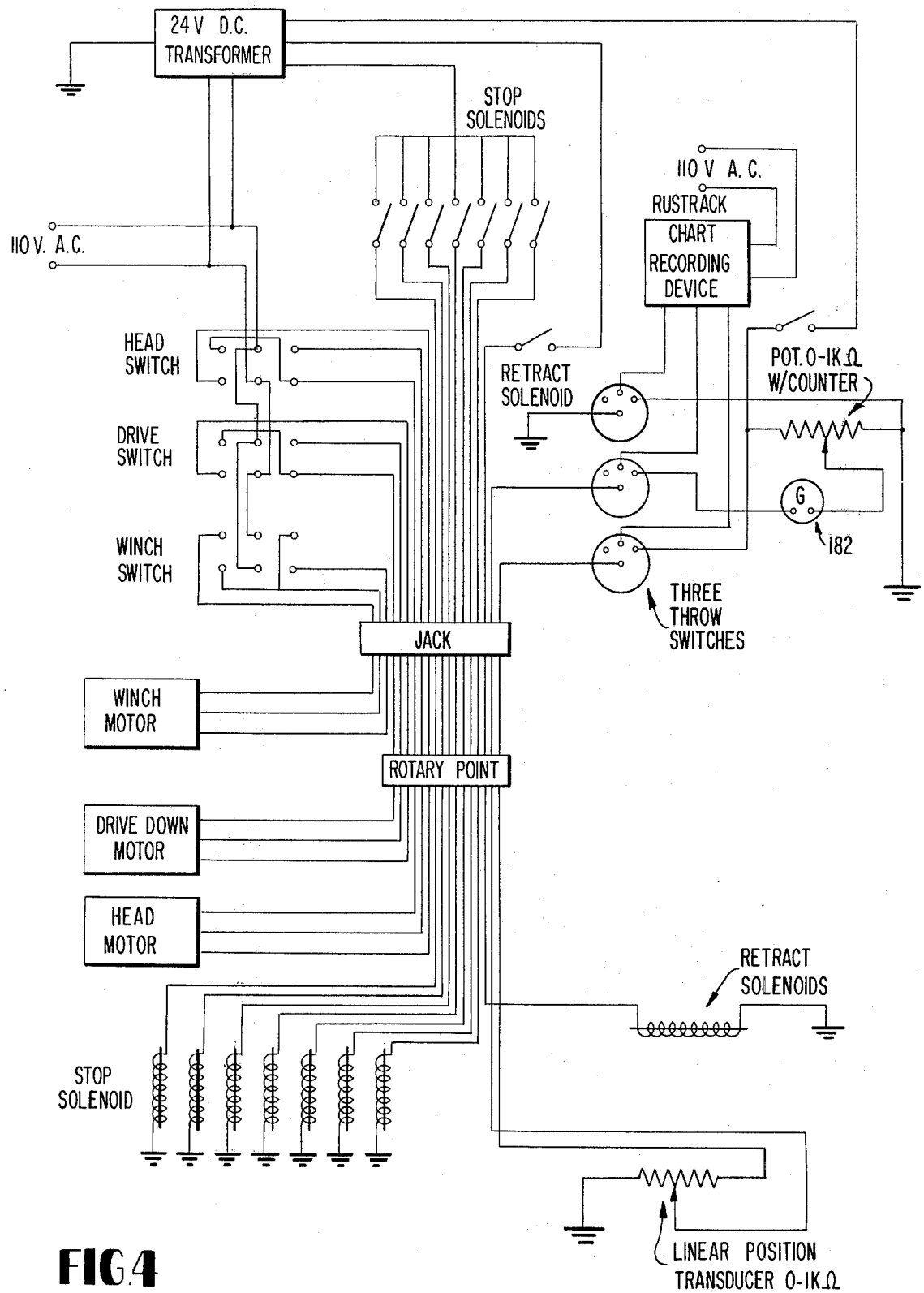
FIG. 4 is a wiring diagram of the circuitry of the apparatus of FIGS. 1 to 11.
Figure 5:
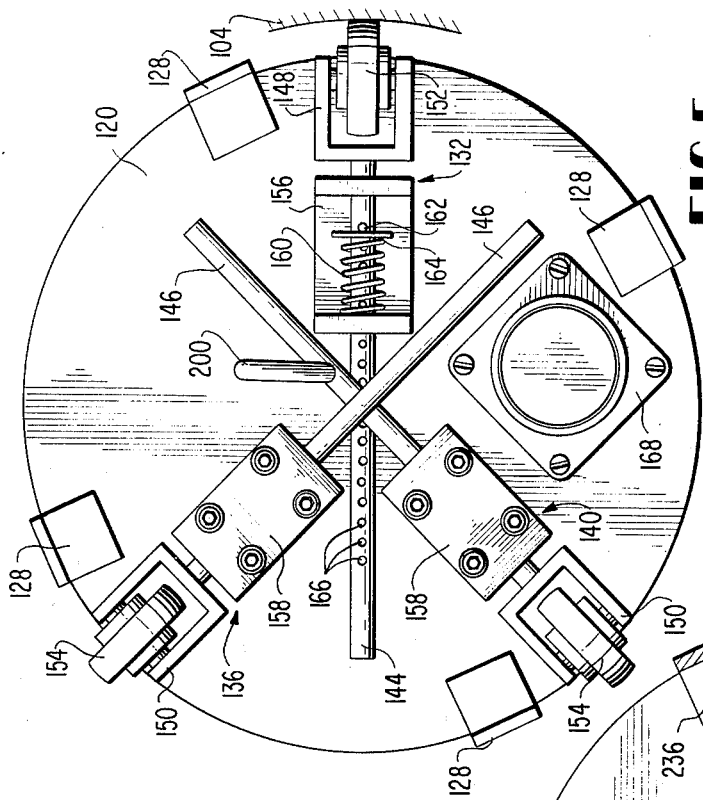
FIG. 5 is a view in cross-section, taken along line 5—5 of FIG. 1.
Figure 6:
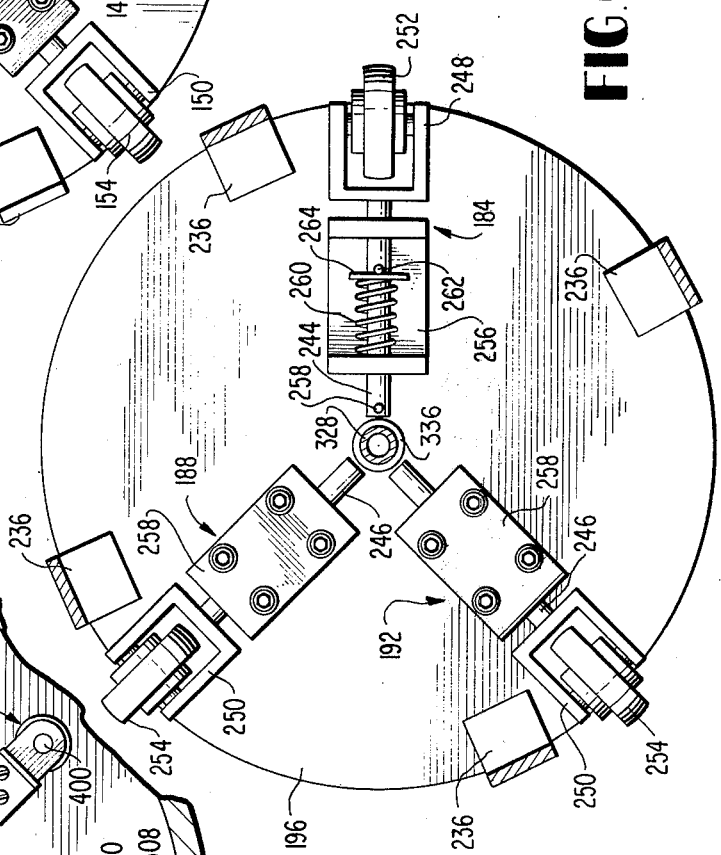
FIG. 6 is a view in cross-section, taken along line 6—6 of FIG. 1.
Figure 7:
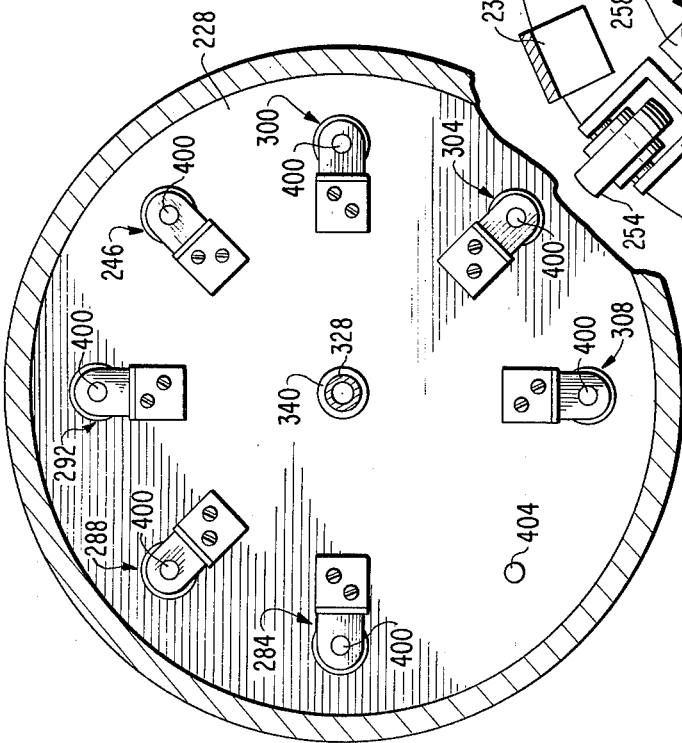
FIG. 7 is a view in cross-section, taken along line 7—7 of FIG. 1.
Figure 12:
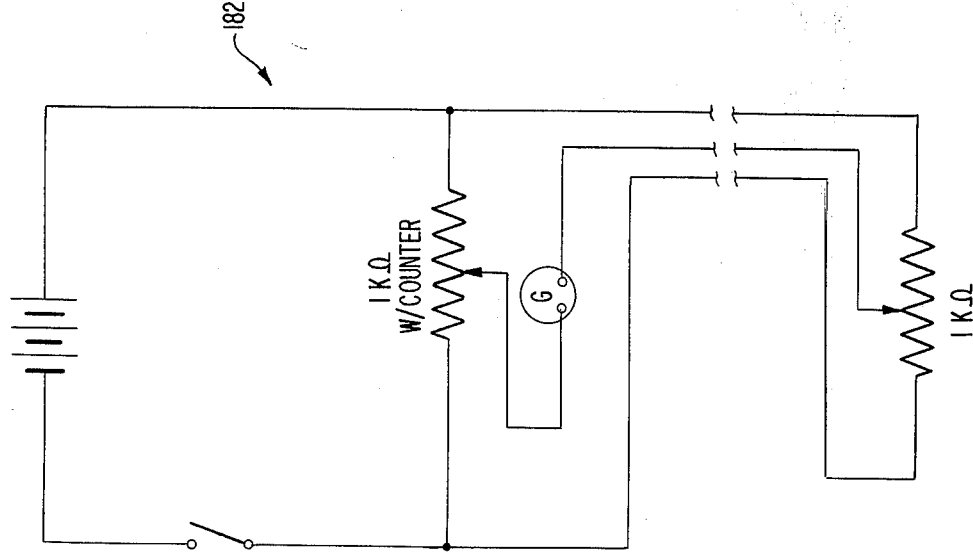
FIG. 12 is a simplified circuitry diagram of the measuring means and above-surface measuring means.

Use of a digitalized surface recording unit has a number of obvious advantages, but the surface recording unit shown by FIGS. 4 and 12 are preferred. A useful digitalized surface recording unit is Model 1230 Digital Panel Meter in combination with Model 500 Digital Printer, both sold by Weston Instruments, Inc., of Newark, N.J.

Segment 224 of pile scanner unit 108, tubular casing 212, top cover plate 196 and lower cover plate 228 forms a bottom casing. A portion of top cover plate 196 fits into tubular casing 212 and a portion fits over the top rim of tubular casing 212 — seal 216 is located between upper cover plate 196 and the top rim of tubular casing 212. Seal 216 can be made of any suitable sealant material, but preferably is an O ring neoprene seal. A portion of lower cover plate 228 fits into tubular casing 212 and a portion fits over the bottom rim of tubular casing 212 — seal 220 is located between lower cover plate 228 and the bottom rim of tubular casing 212. Seal 220 can be made of any suitable sealant material, but preferably is an O ring neoprene seal. Segment 224 is a completely sealed unit which is vapor and liquid impenetrable. Four L-shaped brackets 236 are mounted on top cover plate 196. The top portions of brackets 236 are mounted on the lower end of casing 116, thereby attaching casing 212 to casing 116. Wheel units 184, 188 and 192 are, respectively similar to wheel units 132, 136 and 140. See FIG. 6. Wheel unit 184, includes rod 244, U-shaped bracket 248, wheel 252, spring box 256, spring 260 and ring (washer) 264, mounted on rod 244. Spring 260 presses against ring 264, thereby urging wheel 252 against the internal wall of pipe piling 104. Rod 244 contains a series of holes 258. Pin 262 fits into one of the holes 258 (see FIG. 6), which in turn positions ring 264 on rod 244. Wheel units 188 and 192 each includes rod 246, U-shaped bracket 250, wheel 254 and fixed wheel holding block 258. Rods 246 are adjustable within fixed wheel holding blocks 258 in order to be able to adjust for various diametered pipe piles. Each fixed wheel holding block 258 is comprised of two parts which form an internal passageway in which a rod 246 fits.

Rods 244 and 246 can have extension rods attached to the inner ends thereof when larger diameter pipe pilings are measured so as to be as long as rods 144 and 146.

Part of cable 272, which is connected to electrical connector 168, passes through a hole (not shown) in plate 276 and through a hole (not shown) in hollow shaft 328 into the center portion of shaft 328. That part of cable 272 extends down the center portion of shaft 328, part of it exiting out hole 330 and connecting with stop solenoids 284, 288, 292, 296, 300, 304, and 308 (which are mounted on plate 228) and the remainder thereof exiting out of the bottom of shaft 328 as electrical cable 348.

Plate 276 is mounted on [-shaped brackets 316, which are mounted on bottom cover 122. Motor 320 is mounted on plate 276 and electrically connected to part of electrical cable 272. Head motor 320 is an A.C. capacitor run, constant speed, non-synchronous motor. Shaft 324 of motor 320 is connected to hollow shaft 328 via shaft connector 332. Shaft 328 extends through a hole (not shown) in bottom cover plate 122, through hole 336 in plate 196, and through hole 340 in plate 228; shaft 328 is finally attached to plate 344. A seal is mounted around shaft 328 every place it exits to the outside — such seals are vapor and liquid impenetrable. There are rubber (or similar type of material) seals whereever there are holes exiting to the outside of segments 224, 226 and 352.

While pipe pilings which are driven have their head rim plate-butt welded, tapered-plate welded or contain force fitted boots, ruptures and cracks occur which cause problems of ground water leakage. Rain water can also get into the driven piles. These and other factors make it necessary to enclose portions of pile scanner 100 to protect it from liquids (and vapors).

Electrical cable 348 is electrically connected to retraction solenoid 350 and potentiometer 394. The wires of cable 348 exit out passageways 732. Rotable measuring subassembly 352 includes plate 344, cover 356 (which is mounted on plate 344 by means of fixed bolt arms 360) and plate 364 (which is mounted on fixed bolt arms 360). Solenoid 350 is mounted on plate 364. Solenoid 350 includes solenoid shaft 368, solenoid shaft spring 372 (e.g., 5 pound tension) and solenoid extension plate 376 (one end of which is mounted on the outer end of solenoid shaft 368). See FIG. 9. Solenoid extension plate 376 is mounted on its other end on shaft 380 of measuring wheel unit 384. Shaft 380 is mounted in passageways in potentiometer holding blocks 388 and 392 of potentiometer assembly 394. Each potentiometer holding blocks 388 and 392 includes a key hole slot which is closed by bolt 602. The key hole slot contains brushings 608, in which potentiometer casing 604 is mounted. Potentiometer assembly 394 includes a linear position transducer (potentiometer 396), potentiometer casing 604 and a potentiometer adapter 402. Shaft 382 moves in and out of a passageway in linear position tranducer 396, and casing 604 moves outside of transducer 396.

Calibration block 398 is mounted on plate 344 on the axis of shaft 380 behind potentiometer assembly 394. See FIG. 8. Measuring wheel 728 is mounted on the end of shaft 380 and is mounted horizontal to the longitudinal axis of pile scanner 100 of pipe piling 104; wheel 728 contacts the inside wall of pipe piling 104 when solenoid 350 is in the inactive position (being forced against the inside wall by solenoid spring 372). When solenoid 350 is activated, measuring wheel 728 is drawn in (overcoming the outward force of solenoid spring 372).

FIG. 12 is a simplified circuitry drawing of the overstress detection and measuring means of the apparatus of FIGS. 1 to 11. The bottom potentiometer (see the one in measuring segment 352) is balanced out in the galvenometer by the top potentiometer (located on the surface). The counter associated with the top potentiometer gives a reading which can be correlated with the distance measurement producing the output value of the bottom potentiometer — the reading can be recorded on an appropriate recording means such as a Rustak Model 400 Potentiometer Recorder, sold by Rustak Inst. Div., Gulton Industries, Inc., of Manchester, N.H.

Waterproof expandable rubber boot 744 fits around shaft 380 and extension plate 376 to make the measuring means 352 water and vapor impenetrable.

Sensing wheel 728 can have a position which is vertical (parallel) to the longitudinal axis of pipe scanner 100 or pipe piling 104 by turning sensing wheel 728 to that position before pipe scanner 100 is inserted in pipe piling 104. This allows pipe scanner 100 to be used to make a longitudinal profile of pipe piling 104. This allows correlation of or checking of the location of where each series of radial measurements are made, of where rock— or the like — caused bulges have occured, of where changes in the wall configuration have occured in relation to other places in the piling. Sensing wheel 728 can be returned to the vertical position (perpendicular to the longitudinal axis of pipe pile 104) when pipe scanner 100 is removed from pipe pile 104.

Shaft 328 (driven by motor 320) rotates (advances) rotable measuring subassembly 352. Coordinated with the rotation caused by shaft 328, subassembly 352 is rotated. At the start of the cycle, block 600 rests against one side of pin 404. Pin 404 is mounted in plate 228. Each of stop solenoids 284 to 308 include a solenoid shaft 400 which extends through a hole in plate 228. See FIGS. 7 and 8. The seven solenoids 284 to 308, plus pin 404, are mounted 45° apart on plate 228.

When solenoid 284 is inactivated, its solenoid shaft 400 is far enough out to stop the rotation of measuring subassembly 352 (by coming in contact with block 600). A measurement of the internal diameter of pipe piling 104 is made and recovered by the above-ground recording system. Solenoid 284 is activated, its solenoid shaft 404 move upwards; measuring subassembly 352 rotates 45° until stop block 600 contacts extended solenoid shaft 400 of sequentially inactivated solenoid 288. A measurement is taken and the sequence is repeated until block 600 of measuring subassembly 352 finally comes to rest again against stud pin 404. Measuring assembly 352 is returned to the starting position by reversing the above procedure (without taking any measurements). An alternative for reversing measuring subassembly 352 is circuit means for activating all of stop solenoids 284 to 308 (which are suction solenoids) in order to simultaneously raise all pins 400. (Scanning device 100 is then positioned at another depth in pipe piling 104 to make another set of measurements.)

Drive unit 112 includes tubular casing 408, top cover 412 and bottom covering 416. Plate 428 is mounted on brackets 432, which are mounted on bottom cover 416. Plate 436 is mounted on brackets 440, which are mounted on plate 428. Electrical connector 180 is mounted on and in top cover 412. Electrical cable 176 extends through a hole (not shown) in plate 436, through hole 444 in plate 428 and through a hole (not shown) in cover 416. Motor 448 is mounted on plate 428. Drive motor 448 is an A.C., capacitor run, constant speed, non-synchronous motor. Motor 448 is electrically connected to electrical connector 180. Shaf 452 of motor 448 contains 45° (beveled) gear 456 that meshes with 45° (beveled) gear 460 mounted on shaft 464. Shaft 464 is rotably mounted in shaft box 468 (includes brushing 470), which is mounted on plate 428. See FIGS. 2 and 11. Beveled gear 476 (45°) is mounted on the end of shaft 464 and engages 45° (beveled) gear 480, which is mounted on shaft 484. Shaft 484 is rotably mounted on L-shaped wheel mounting fixture 472. The other angle arm of wheel mounting fixture 472 is adjustable (in and out) mounted on the bottom of plate 436. Drive wheel 488 is mounted on shaft 484 and extends through an opening in casing 408. Drive wheel 488 engages the inside wall of pipe piling 104, and is used primarily to move scanner device 100 along a horizontal pipe piling 104. Shaft 464 is adjustable in its mounting position so that it can be adjusted to engage wheel 488 with the inside wall of various diametered pipe piles.

Wheel unit 492 is mounted on top plate 412. Wheel unit 492 includes rod 496, U-shaped bracket 500, wheel mounting box 504 and wheel 508. Wheel 508 contacts the inside wall of pipe piling 104, and helps align pipe scanner 100 in pipe piling 104. Rod 496 is adjustable in box 504. Wheel 488 is mounted at a 90° angle to wheel 508; wheels 488 and 508 are aligned, repsectively, in a vertical plane with two of the other fixed wheels.

Drive unit 112 contains lifting ring 512 (it is noted that lifting ring 200 is present on top plate 124 of pile scanner unit 108). A cable 532 is attached to lifting ring 512 and is used to raise and lower pipe scanner unit 100 in pipe pile 104. Cable 532 is the main means of raising and lowering pipe scanner unit 100. Drive wheel 508 (and drive unit 112) is essentially only used to move a pipe scanner unit 100 when a horizontal pipe is being measured. Drive wheel 508 can be used to position pipe scanner unit 100 in a vertical pipe pile 104 for measurements of the internal diameter(s) of pipe pile 104, but this does not usually give an accurate longitudinal positioning in a vertical pipe pile 104. Cable 532 preferably contains a strong flexible steel cable for lifting purposes and incorporates an electrical cable connected to electrical connector 180. Cable 532 is wound up or unwound on winch spool 516, which is mounted on winch plate 520 of winch unit 524. Unit 524 is mounted on pipe piling 104 by means of C-shaped end 528 of pile clamps 534 that are mounted on the bottom of plate 520. Unit 524 also includes cover 536 and reversible motor 540, which drives spool 516. The electrical cable portion of cable 532 extends into shaft 544 of spool 516 (via a hole, not shown in spool 516) and exits out (548) of rotary joint stand 552 (by means of rotating electrical connector 554). Electrical cable 548 is in communication with the appropriate power source and recording — indication system 182 by means of electric jack 556. If drive means 112 are not used, then the cable is attached to lifting ring 200 and spool 516 (winding and unwinding cable 532) is used to position pipe scanner 100 for measurements as well as raising and lowering pipe scanner 100 in pipe piling 104. Otherwise the description for lifting ring 512 applies to lifting ring 200.

Use of a digitalized surface recording unit has a number of obvious advantages, but the other surface recording unit shown by FIGS. 4 and 12 is preferred. A useful digitalized surface recording unit is Model 1230 Digital Panel Meter in combination with Model 500 Digital Printer, both sold by Weston Instruments, Inc., of Newark, N.J. (FIG. 13 shows the alternative use of the digitalized surface recording unit and the galvanameter and counter.)

For example, head motor 320 can be a 1/50 H.P. Bodine Motor having at 9.4 rpm, a torque of 40 in.-lbs., is a NCI type and is a 115V AC Cap. Rev. OBB. For example, drive motor 448 can be a 1/30 H.P. Bodine Motor having, at 28 rpm, a torque of 40 in.-lbs., is a NCI type and is a 115V AC Cap. Rev. OBB. For example, winch motor 540 can be a ½ H.P. TE/FC split phase Dayton gearmotor having the following specifications: F/L rpm, 60; ratio, 28.6:1 and torque, 480 in./lbs. For example, retract solenoid 348 can a size H made by Hi-G Incorporated, Windsor Locks, Conn., which has the following specifications: a coil resistance at 25°C. of 0.503 ohms at a duty cycle of 10 percent at 6 VDC a response time of 22.5 milliseconds at a duty cycle of 10 percent; and snap ring diameter of 0.746. For example, each of stop solenoids 284 to 308 can be a size C made by Hi-G Incorporated, Windsor Locks, Conn., which has the following specifications: a coil resistance at 25°C of 1.57 ohms at a duty cycle of 10 percent at 6VDC; a response time of 10 milliseconds at a duty cycle of 10 percent; and a snap ring diameter of 0.0446. The electrical connectors can be amphenols.

The surface recording means can be a potentiometric recorder (preferred) or other suitable recording means. The potentiometric recorder can be Model 400 Potentiometer Recorder made by Rustak Instrument Div. of Gulton Industries, Inc., Manchester, N.H.

FIG. 4 is a self-explanatory wiring diagram of the circuitry of the apparatus of FIGS. 1 to 3 and 5 to 11.

The preferred embodiment of the process of this invention involves the use of the preferred embodiment of this invention (as embodied in FIGS. 1 to 13).

FIGS. 14 to 16 illustrate another embodiment of this invention. Pipe scanner 800 is located inside of (hollow) pipe piling 804. Pipe scanner includes elongated tubular casing 808, wheel sets 812 and 816, outward-pressured wheel arrangement 820, rotating means 824 and diameter scanner 828. Wheel set 812 includes wheel 832 and leg 836, which is adjustably mounted to one side of square plate 840, and wheel 844 and leg 848, which is adjustably mounted to another side of square plate 840. A ninety degree placement results. Plate 840 is mounted around casing 808 (near its top). Wheel set 816 includes wheel 852 and leg 856, which is adjustably mounted on one side of square plate 860, plus wheel 864 and leg 868 which is adjustably mounted on another side of plate 860. A 90° placement results. Both sets of wheels are vertically aligned together. Outwardpressured wheel arrangement 820 includes arm 872, which is pivotally attached to pivot housing 874, i.e., is mounted on casing 808 below a bottom corner of plate 840, wheel 876, which is rotably mounted on the free end of arm 872, spring rest 878, which is mounted on casing 808, and curved leaf spring 880. (Spring rest 878 is used in order to get more spring tension, but a heavier leaf spring can be used instead). Wheel 876 is aligned so that it is a vertical plane which splits wheel sets 812 and 816. This gives stability and alignment to pipe scanner 800. Wheel 876 engages the wall of pipe pile 804 and is outwardly pressured by curved leaf spring 880 (which is attached at one end to pivot housing 874 — to the same location on casing 808 where arm 872 is attached).

Eye hook 884 is mounted on top of plate 840 and is used to attach a cable by which pipe scanner 800 is raised and lowered in pipe pile 804. The means for raising and lowering pipe scanner 800 are pieces of rods (usually 10 foot in length), one of which is connected to universal joint 888. Universal joint 888 is connected to hollow casing 824, which extends through casing 808 and is rotable therein. The rods extend to the surface. The rods are used to turn casing 824 which allows the radial positioning of diameter scanner 828. Plate 892 of diameter scanner 828 is attached to the lower end of casing 824. Stop block 990 is mounted on the top of plate 892, and stop block 994 is mounted on the bottom of plate 860. Blocks 990 and 994 keep the diameter scanner from being turned more than about 360 degrees.

Diameter scanner 828 is similar to rotable measuring assembly 352 of the preferred embodiment of this invention. The main difference is that retraction solenoid 896 is forced into the retraction position by means of air pressure. See FIG. 14. Air hose 900 extends from the surface and passes down casing 824 to air coupling 904 on solenoid 896 — the pressurized air causes retraction of solenoid shaft 908 in opposition to solenoid spring 912. Solenoid 896, which is mounted on the bottom of plate 892, also includes air valve assembly 916, solenoid extension plate 920 and solenoid body 924. Solenoid extension plate 920 is urged outwards by spring 912. Solenoid extension plate 920 is attached on its other end to shaft 924 of wheel unit 928. Shaft 924 is attached to potentiometer casing 932, which is mounted in passageways of potentiometer holding blocks 936 and 940 of potentiometer assembly 944. Potentiometer assembly 944 includes a linear position transducer (potentiometer), potentiometer casing 932 and a potentiometer adapter. Calibration assembly 948 is mounted on plate 892 on the axis of shaft 924. Measuring wheel 952 is mounted on the end of shaft 924 and is horizontal to the longitudinal axis of pipe scanner 800. Wheel 952 contacts the inside wall of pipe pile 804 when solenoid 896 is in the inactive position (being forced against the inside wall by solenoid spring 912).

A measurement of the internal diameter of the wall is made when wheel 952 is pressed against the wall of pile 804 (at a desired level therein). The measurement is recorded by the above-ground recording system (i.e., a strain gauge) which is electrically connected to pipe scanner 800. The connecting electric cable can follow the same path as air hose 900. Diameter scanner 828 is then manually rotated to another radical position and another measurement taken, etc. Then diameter scanner 828 is manually rotated back to its starting radial position.

Pipe scanner 800 can be moved up or down pipe pile 804 for another set of measurements at another desired level.

Casing 824, at both ends of casing 808, is encased in race 980, bearing 984 and sealing ring 988 (see FIG. 13).

The top of pipe piling 804 had mounted thereon a top turning guide which comprised two C-shaped units which fit around the turn rods — 45° marks were placed on the top turning guide surface so as to help position pipe scanner 800.

Using the apparatus of FIGS. 14 to 16, a compression test was run on pipe piles. A series of readings were taken at nine points around the circumference at various depths in each pipe piling. The readings were taken at 0°, 45°, 90°, 135°, 180°, 225°, 270°, 315°, and 349°. The nine readings were added together ($\Sigma$) — by adding such readings together, it took care of the position of the pile scanner (instrument) with respect to the center of the pipe. (The center of the instrument is slightly off of the center of the pile in most cases, but this is compensated for as shown above. For the true radius, the sum of the nine readings is divided by nine and a constant is added to the quotient.) An example is

| depth of pile | before (test or driving) | $\Sigma$ after | $\Delta\Sigma$ |
|---|---|---|---|
| 4 ft. | 6.941 | 7.185 | 0.244 |

Figure 17:
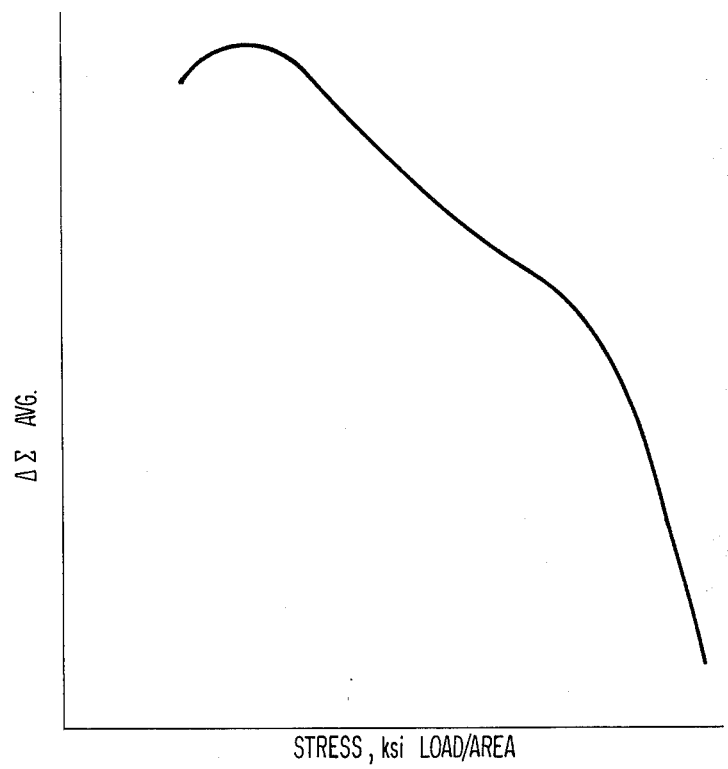
FIG. 17 is a graph for finding relative stress with respect to $\Delta \Sigma$ ave.

The tests are taken at various depths for each pile and the $\Delta\Sigma$ for each longitudinal level (position) in the pile are averaged — this quotient is applied to curves to determine the degree or value of overstress in a particular piling. The curves were developed through load tests in the laboratory, that is, a pipe was loaded to a certain stress, readings were taken, etc., and curves developed. FIG. 17 sets out the laboratory curve for finding relative stress with respect to ΔΣ ave. The data from sections D, E and F in a pipe piling were:

| SECTION D | | |
|---|---|---|
| Stress (psi) | Strain (in/in) | ΔΣ avg. |
| 42,337 | 0.001650 | 0.198 |
| 46,639 | 0.002890 | 0.274 |
| 50,137 | 0.008800 | 0.321 |
| SECTION E | | |
| Stress (psi) | Strain (in/in) | ΔΣ avg. |
| 47,599 | 0.002910 | 0.254 |
| 49,931 | 0.008110 | 0.341 |
| SECTION F | | |
| Stress(psi) | Strain (in/in) | ΔΣ avg. (from Instrument) |
| 37,585 | 0.000725 | 0.181 |
| 47,325 | 0.002870 | 0.248 |
| 51,029 | 0.007630 | 0.363 |

Note: Strain data obtained from a university report.

Figure 18:
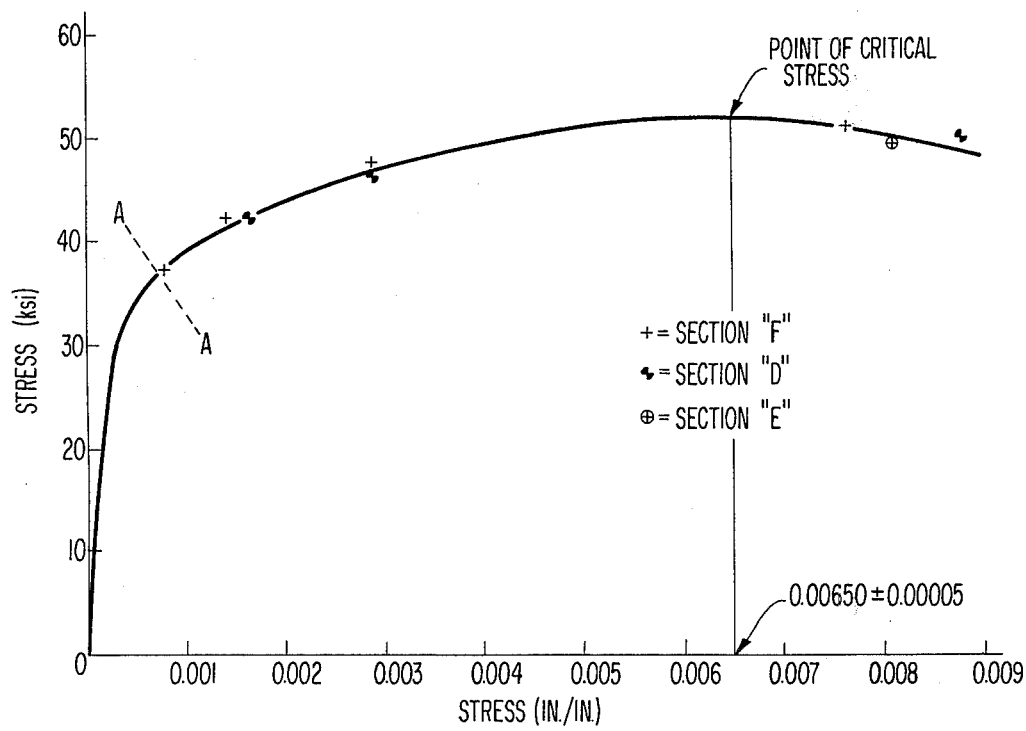
FIG. 18 is a graph of strain v. stress.
Figure 20:
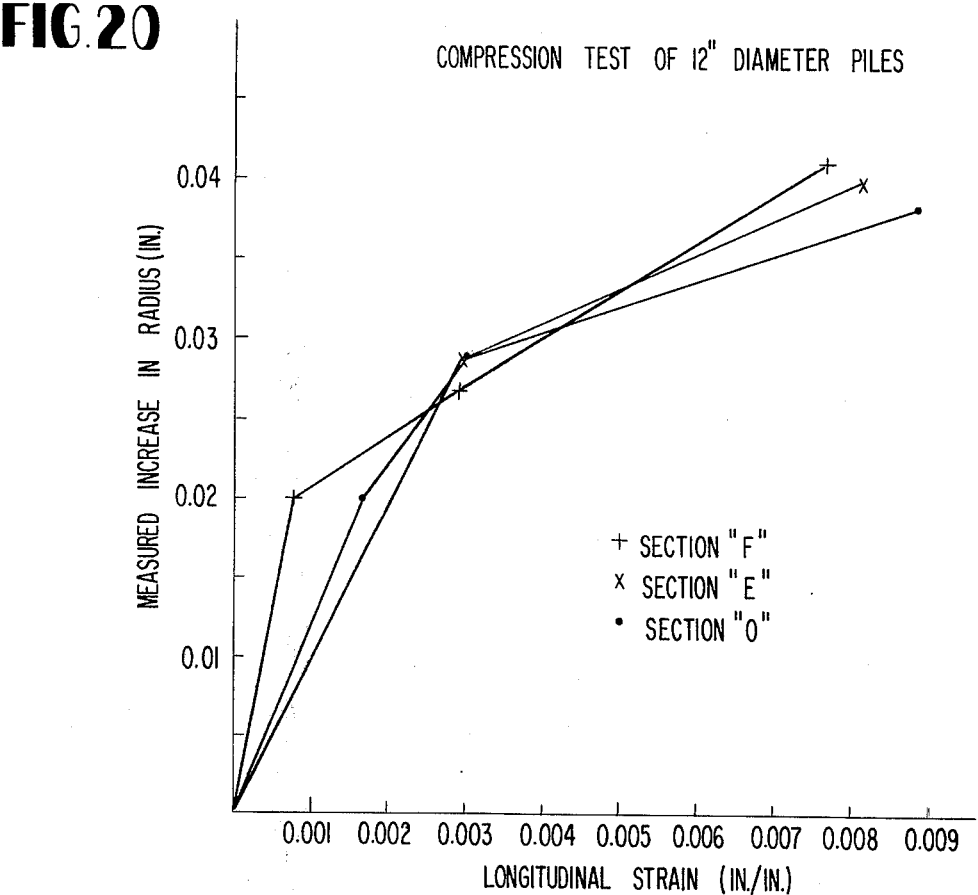
FIG. 20 is a graph of measured increase in radius vs. longitudinal strain for a particular compression test.
Figure 19:
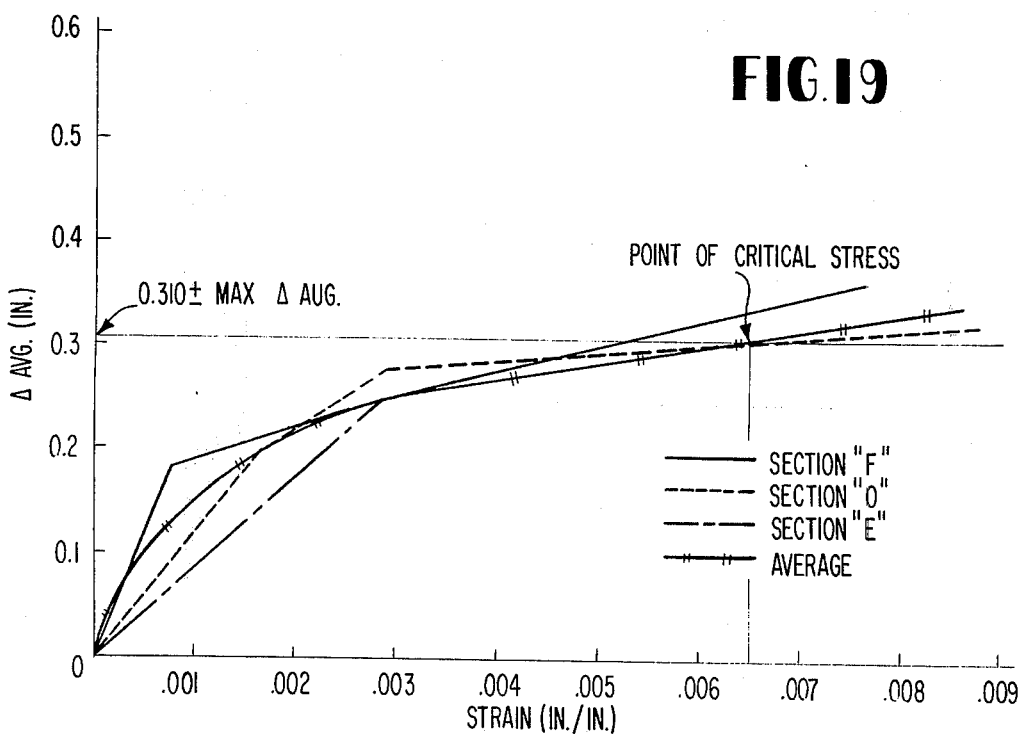
FIG. 19 is a graph of strain vs. $\Delta \Sigma$ ave.

FIG. 18 is a graph of strain (in/in) versus stress (ksi) for sections D, E and F. The point of critical stress is indicated, and used to locate the point of critical stress in FIG. 19. Strain (in/in) is plotted against ΔΣ ave (in.) for sections D, E and F. The value of ΔΣ ave, for the point of critical stress is 0.310.

Referring to FIG. 18 of stress vs. strain, the point of critical stress is often termed the point of maximum obtainable stress. Line A—A represents the yield point where actual plastic deformation starts and is classically termed overstress. But hollow columns act differently than the normal situtation. So herein, applicant terms overstress as starting at the point of critical stress.

The apparatus of this invention has a center axis which in practice will usually not coincide with the center axis of the pipe piling. There would be no problem (as a constant could be used to compensate) if the pipe piling did not change shape after driving. So the average of a number of measurements at different compass points at a particular level in the pipe piling must be made before and after driving — this allows a comparison of what in effect is the cross-section of the pipe piling at that level before and after driving, the difference being a measurement or indication of the overstress (or stress) present in the pipe piling at that level.

Using the preferred apparatus of FIGS. 1 to 13, a compression test was run on a pipe pile (12¾ × 0.375). A series of readings were taken at nine points around the circumference at various depths in each pipe piling. The readings were taken at 0°, 45°, 90°, 135°, 180°, 225°, 270°, 315° and 349°. The nine readings were added together (Σ) — by adding such readings together, it took care of the position of the pile scanner (instrument) with respect to the center of the pipe. (The center of the instrument is slightly off of the center of the pile in most cases, but this is compensated for as shown above. For the true radius, the sum of the nine readings is divided by nine and a constant is added to the quotient.) For the three measurement levels:

| depth of pile | Σbefore (test or driving) | Σ after | ΔΣ |
|---|---|---|---|
| 10 ft. | 7.146 | 6.957 | 0.189 |
| 20 ft. | 7.075 | 7.012 | 0.063 |
| 30 ft. | 7.036 | 7.024 | 0.012 |

The tests are taken at the three depths in the pile were are averaged (ΔΣ ave. = 0.88) — this quotient is applied to curves to determine the degree or value of overstress in a particular piling. The curves were developed through load tests in the laboratory, that is, a pipe was loaded to a certain stress, readings were taken, etc., and curves developed. An example of the curve is FIG. 17 for the aforegoing example which sets out the laboratory curve for finding relative stress with respect to ΔΣ ave. Using strain data obtained from a university report, a curve like FIG. 18 of a graph strain (in/in) versus stress (ksi) is prepared. The point of critical stress is indicated, and used to locate the point of critical stress in a curve like FIG. 19. Strain (in/in) is plotted against ΔΣ ave (in.) The value of ΔΣ ave., for the point of critical stress is 0.310. There was no overstress since the ΔΣ ave. was 0.88.

The driving of the pile was done with a Delmag D-30 hammer. After the 40 foot pile was driven into place (home), it had a load capacity of 115 tons.

What I claim is:

1. An apparatus for determining the load-carrying capability of a hollow pile driven into the ground to carry a load whereby changes in the internal surface configuration of said pile at various point along its length are measured, comprising: a body member defining a longitudinal axis; rotatable sensing means, which is rotatable in relation to said body member about said axis, for entering and sensing the distance of a straight line extending from the longitudinal axis of said apparatus to the internal wall of said pile in any radial direction at any point along the length of said pile and for producing a signal representative of the distance of said line; means, independent of the longitudinal position of said apparatus in said pile, for rotating said rotatable sensing means to any desired radial position; and drive means for moving said body member longitudinally in said pile to any desired point along the length of said pile.

2. An apparatus as described in claim 1 wherein said rotatable sensing means includes a linear potentiometer for producing the signal representative of said distance.

3. An apparatus as described in claim 2 wherein said apparatus includes means for transmitting said signal representative of said distance to a potentiometer recorder, located on the surface, and said potentiometer recorder records said signal representative of said distance.

4. An apparatus as described in claim 2 wherein said apparatus includes means for transmitting said signal representative of said distance to a digitalized potentiometer recorder, located on the surface, and said digitalized potentiometer recorder records said signal representative of said distance.

5. An apparatus as described in claim 1 wherein said signal is indicated by indicating means located on the surface.

6. An apparatus as described in claim 1 wherein said apparatus includes means for transmitting said signal representative of said distance to recording means, located on the surface, and said recording means records said signal representative of said distance.

7. An apparatus as described in claim 1 wherein said rotatable sensing means is rotatably attached to said body member, and includes a rotatable sensing unit which is rotatable in a plane perpendicular to the longitudinal axis of said pile, which includes a wheel mounted on the end of the shaft of a linear potentiometer, a solenoid connected to said shaft, and biasing means, said biasing means engaging said wheel against the internal wall of said pile when said solenoid is inactivated, and said solenoid acting against said biasing means and disengaging said wheel from said internal wall when said solenoid is activated, said linear potentiometer producing a signal representative of said distance indicated by said wheel engaging the internal wall of said pile.

8. An apparatus as described in claim 7 wherein said rotatable sensing unit is rotated by means of a motor, mounted on said body member, which turns a shaft upon which said rotatable sensing unit is mounted.

9. An apparatus as described in claim 8 wherein said drive means for moving said rotatable sensing unit includes a motor driven wheel, which engages the internal wall of the piling, whereby said rotatable sensing unit is moved longitudinally in said pile, said motor driven wheel being mounted on said body member.

10. An apparatus as described in claim 9 wherein a winch cable is attached to said body member, said winch cable being movable by a surface-located motor-driven winch.

11. An apparatus as described in claim 10 which includes at least two sets of wheels mounted on said body member for orienting said longitudinal axis of said body substantially on the longitudinal axis of said pile.

12. An apparatus as described in claim 11 wherein each set of wheels comprises three wheels which engage the interior wall of said pile, one of said wheels being outwardly biased and the other two of said wheels being adjustable towards and away from said body member so that said rotatable sensing means can be used in piles having substantially different internal diameters.

13. An apparatus for determining the load-carrying capability of a hollow pile driven into the ground to carry a load whereby changes in the internal configuration of said pile at various points along its length are measured, comprising:
  a. a sealed, elongated top casing having a circular cross-section;
  b. a sealed, elongated, bottom casing having a circular cross-section, which is attached to top casing (a) by bracket means, there being a space between top casing (a) and bottom casing (b);
  c. reversible motor means mounted in top casing (a);
  d. rotatable shaft means extending from motor means (c) through top casing (a) and on through bottom casing (b) to a point outside thereof;
  e. a rotatable sensing unit attached to the end of shaft means (d), rotatable sensing unit (e) thereby being rotatable in relation to top casing (a) and bottom casing (b) and independently of the longitudinal position of said apparatus in said pile, such rotatable sensing unit being capable of sensing the distance of a straight line extending from the longitudinal axis of said apparatus to the internal wall of said pile in any radial direction at any point along the length of said pile and for producing a signal representative of said distance of said line, the rotatable sensing unit comprising:
   i. a linear potentiometer,
   ii. a wheel attached to the end of the shaft of linear potentiometer (i), such wheel (ii), when engaging said internal wall of said pile, being an indication of said distance from said longitudinal axis of said apparatus to said internal wall of said pile,
   iii. a retraction solenoid, the shaft thereof attached to the shaft on which wheel (ii) is mounted, and
   iv. biasing means, such biasing means (iv) engaging wheel (ii) against the internal wall of said pile when solenoid (iii) is inactivated, and solenoid (iii) acting against biasing means (iv) and disengaging wheel (ii) from said internal wall of said pile when solenoid (iii) is activated, linear potentiometer (i) producing a signal representative of said distance indicated by said wheel engaging said internal wall of said pile;
  f. two sets of wheels, one such set of wheels mounted on top of casing (a), and one such set of wheels mounted on the top of bottom casing (b), such two sets of wheels for orienting said apparatus substantially on said longitudinal axis of said pile, and each such set of wheels comprising three wheels which engage said interior wall of said pile, one of such wheels being outwardly biased and the other two said wheels being adjustable towards and away from said body member so that said apparatus can be used in piles having substantially different internal diameters;
  g. (i) at least one suction solenoid mounted on the bottom wall of casing (b), the shaft thereof extending through such wall, (ii) a pin extending through the bottom wall of casing (b), and (iii) a block mounted on top of rotatable sensing means (e), block (iii) radially positioning said rotatable sensing means (e), as said rotatable sensing means (e) rotates, by block (iii) contacting the extended shaft of one of suction solenoids (i) or pin (ii) by preventing further rotation of rotatable sensing means (e) until the shaft of such solenoid (i) is retracted or rotatable sensing means (e) is rotatably reversed in direction;
  h. surface-located motorized means for inserting said apparatus into said pile, for removing said apparatus from said pile and for raising and lowering said apparatus in said pile;
  j. surface-located recording means for recording the signal produced by potentiometer (i) which is representative of said distance of said line which is indicated by the radial position of said rotatable sensing means (e) in said pile; and
  k. means for transmitting said signal which is representative of said distance to recording means (j).

14. An apparatus as described in claim 13 wherein biasing means (iv) is a spring.

15. An apparatus as described in claim 13 wherein wheel (ii) is rotatably positioned in a plane parallel to said longitudinal axis of said pile.

16. An apparatus as described in claim 13 wherein wheel (ii) is rotatably positioned in a plane perpendicular to said longitudinal axis of said pile.

17. An apparatus for determining the load-carrying capability of a hollow pile driven into the ground to carry a load whereby changes in the internal configuration of said pile at various points along its length are measured, comprising:
  a. a sealed, elongated casing having a circular cross-section;
  b. rotatable shaft means extending from a point above casing (a), through casing (a) and on through casing (a) to a point below casing (a);

c. a rotatable sensing unit attached to the end of shaft means (b), rotatable sensing unit (e) thereby being rotatable in relation to casing (a) and independently of the longitudinal position of said apparatus in said pile, such rotatable sensing unit being capable of sensing the distance of a straight line extending from the longitudinal axis of said apparatus to the internal wall of said pile in any radial direction at any point along the length of said pile and for producing a signal representative of said distance of said line, the rotatable sensing unit comprising:
  i. a linear potentiometer;
  ii. a wheel attached to the end of the shaft of linear potentiometer (i), such wheel (ii), when engaging said internal wall of said pile, being an indication of said distance from said longitudinal axis of said apparatus to said internal wall of said pile,
  iii. A retraction solenoid, the shaft thereof attached to the shaft on which wheel (ii) is mounted, and
  iv. biasing means, such biasing means (iv) engaging wheel (ii) against the internal wall of said pile when solenoid (iii) is inactivated, and solenoid (iii) acting against biasing means (iv) and disengaging wheel (ii) from said internal wall of said pile when solenoid (iii) is activated, linear potentiometer (i) producing a signal representative of said distance indicated by said wheel engaging said internal wall of said pile;
d. three sets of wheels, one such set of wheels (i) mounted on a plate mounted on the top of casing (a) on one side thereof, a second such set of wheels (ii) mounted on a plate mounted on the bottom of casing (a) on said one side thereof, and the third such set of wheels (iii) mounted on casing (a) intermediate the two sets of wheels (i) and (ii) and on the opposite side of casing (a) from the two sets of wheels (i) and (ii), such three sets of wheels for orienting said apparatus substantially on the longitudinal axis of said pile, each set of wheels (i) and (ii) comprising two wheels which engage the interior wall of said pile, each of such two wheels being adjustable towards and away from casing (a) so that said apparatus can be used in piles having substantially different internal diameter, and said oppositely mounted wheel set (iii) being a wheel rotatably mounted on an arm which is pivotally mounted on casing (a), said wheel being outwardly biased against said interior wall of said pile by means of a leaf spring mounted between said arm and casing (a);
e. (i) a pin extending through the plate on the bottom of casing (a) and (ii) a block mounted on the top of rotatable sensing unit (c), pin (i) and block (ii) preventing further rotation of rotatable sensing means (c) when they contact each other until rotatable sensing means (e) is rotatably reversed in direction;
f. rod means attached to rotatable shaft means (b) for selectively rotationally positioning rotatable sensing means (c) from the surface;
g. surface-located motorized means for inserting said apparatus into said pile, for removing said apparatus from said pile and for raising and lowering said apparatus in said pile;
h. surface-located recording means for recording the signal produced by potentiometer (i) which is representative of said distance of said line which is indicated by the radial position of rotatable sensing unit (c) in said pile;
j. means for transmitting said signal which is representative of said distance to recording means (h).

18. An apparatus for determining the internal surface configuration of a tube at various points along its length, comprising: a body member defining a longitudinal axis; rotatable sensing means, which is rotatable in relation to said body member, for entering and sensing the distance of a straight line extending from a fixed point on said apparatus to the internal wall of said tube in any radial direction at any point along the length of said tube and for producing a signal representative of the distance of said line; means, independent of the longitudinal position of said apparatus in said tube, for rotating said rotatable sensing means to any desired radial position; and drive means for moving said body member longitudinally in said tube to any desired point along the length of said tube.

* * * * *